United States Patent
Ting

(10) Patent No.: US 9,611,642 B2
(45) Date of Patent: Apr. 4, 2017

(54) EXTERIOR OPAQUE HIDDEN FRAME WALL UNIT

(71) Applicant: Advanced Building Systems, Inc., Wilmington, DE (US)

(72) Inventor: Raymond M. L. Ting, Pittsburgh, PA (US)

(73) Assignee: Advanced Building Systems, Inc., Wilmington, DE (US)

( * ) Notice: Subject to any disclaimer, the term of this patent is extended or adjusted under 35 U.S.C. 154(b) by 0 days.

(21) Appl. No.: 14/230,217

(22) Filed: Mar. 31, 2014

(65) Prior Publication Data

US 2014/0298740 A1    Oct. 9, 2014

Related U.S. Application Data

(60) Provisional application No. 61/809,022, filed on Apr. 5, 2013.

(51) Int. Cl.
*E04B 2/90* (2006.01)
*B32B 17/10* (2006.01)
*E04B 2/96* (2006.01)

(52) U.S. Cl.
CPC .......... *E04B 2/90* (2013.01); *B32B 17/10055* (2013.01); *E04B 2/96* (2013.01)

(58) Field of Classification Search
CPC ...... E06B 7/14; E06B 3/4609; E06B 3/26347; E06B 7/26; E06B 9/52; E06B 1/62; E06B 2003/4453; E06B 3/267; E06B 3/305; E04B 2/96; E04B 2001/405; E04B 2/967; E04B 1/6812; E04B 2/88; E04B 2/90; E04C 2/292; B32B 17/10055

USPC ...... 52/235, 204.1, 204.5, 204.51, 207, 209, 52/656.2, 656.5, 656.6, 204.591
See application file for complete search history.

(56) References Cited

U.S. PATENT DOCUMENTS

| 4,184,301 A | 1/1980 | Ting |
| 4,207,717 A | 6/1980 | Hubbard |
| 4,229,905 A * | 10/1980 | Rush ............................... 49/143 |
| 4,316,351 A | 2/1982 | Ting |

(Continued)

FOREIGN PATENT DOCUMENTS

| DE | 19944872 A1 * | 4/2001 | ............... E06B 7/10 |
| GB | 2148970 A * | 6/1985 | ............... E04B 2/88 |

OTHER PUBLICATIONS

Notification of the Transmittal of the International Search Report and the Written Opinion of the International Searching Authority, or the Declaration, Sep. 12, 2014, for PCT Application Serial No. PCT/US2014/032335.

*Primary Examiner* — Brian Glessner
*Assistant Examiner* — Omar Hijaz
(74) *Attorney, Agent, or Firm* — Beck & Thomas, P.C.

(57) ABSTRACT

Exterior opaque hidden frame wall units and systems combining facing plates and composite insulated panels in a pressure-equalized Airloop system, permitting an opaque hidden frame wall unit without the need for intermediate stiffeners for resisting wind load, without exterior aesthetic problems associated with composite insulated panels, without a separate interior wall, and without interior condensation problems. Also provided are exterior opaque hidden frame Airloop wall units and systems with the air seal being isolated from the water seal on an offset vertical plane and away from the interior surface of the facing plate.

9 Claims, 2 Drawing Sheets

(56) References Cited

U.S. PATENT DOCUMENTS

| | | | | |
|---|---|---|---|---|
| 4,552,790 A | * | 11/1985 | Francis | 428/34 |
| 4,598,513 A | * | 7/1986 | Gartner | 52/206 |
| 4,685,263 A | | 8/1987 | Ting | |
| 4,700,520 A | | 10/1987 | Ting | |
| 4,743,485 A | | 5/1988 | Ting | |
| 4,765,107 A | | 8/1988 | Ting | |
| 4,840,004 A | * | 6/1989 | Ting | 52/235 |
| 4,866,896 A | | 9/1989 | Shreiner et al. | |
| 4,873,805 A | | 10/1989 | Ting | |
| 5,048,248 A | | 9/1991 | Ting | |
| 5,247,770 A | | 9/1993 | Ting | |
| 5,452,552 A | | 9/1995 | Ting | |
| 5,596,851 A | | 1/1997 | Ting | |
| 5,598,671 A | | 2/1997 | Ting | |
| 5,687,524 A | * | 11/1997 | Ting | 52/461 |
| 6,105,973 A | * | 8/2000 | Butler et al. | 277/644 |
| 6,393,778 B1 | | 5/2002 | Ting | |
| 6,591,562 B2 | | 7/2003 | Ting | |
| 6,598,361 B2 | | 7/2003 | Ting | |
| 7,134,247 B2 | | 11/2006 | Ting | |
| 8,001,738 B2 | | 8/2011 | Ting | |
| 8,191,325 B2 | | 6/2012 | Ting | |
| 2003/0041538 A1 | | 3/2003 | Ting | |
| 2003/0061783 A1 | * | 4/2003 | Duncan et al. | 52/745.19 |
| 2003/0221381 A1 | | 12/2003 | Ting | |

* cited by examiner

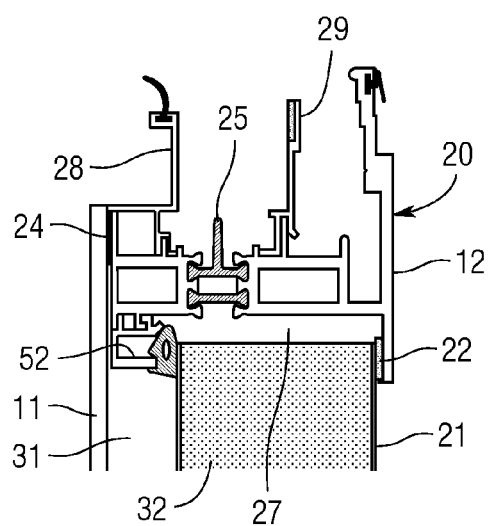
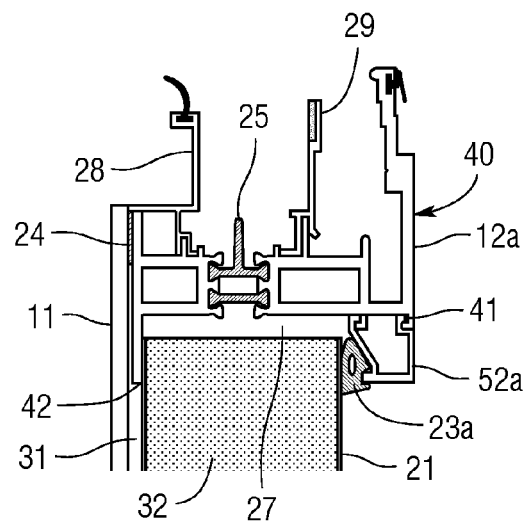
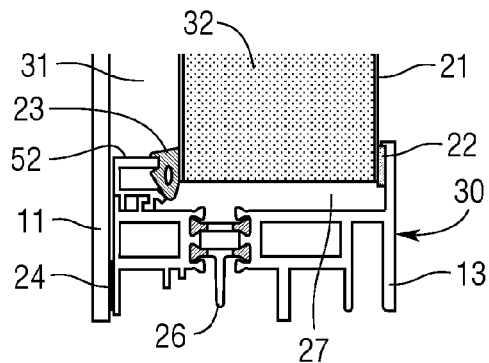
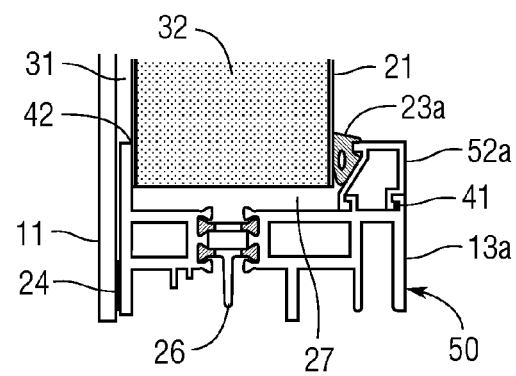
*Fig.2A*      *Fig.2B*

EXTERIOR OPAQUE HIDDEN FRAME WALL UNIT

CROSS REFERENCE TO RELATED APPLICATION

This application claims the benefit of U.S. Provisional Patent Application No. 61/809,022, filed Apr. 5, 2013, and which is hereby incorporated by reference in its entirety.

BACKGROUND OF THE INVENTION

This invention is related to the building envelope system design applicable to an exterior wall design such as a curtain wall system or a window wall system.

An exterior wall is formed by multiple wall units joined and sealed between two adjacent wall units in both horizontal and vertical directions. The major functions of an exterior wall include the aesthetic design provided by the project architect and the interior environmental protection design provided by the exterior wall system designer or supplier. It is well recognized in the industry that wind load resistance and water-tightness performance are the two most important functions in the interior environmental protection design. In opaque areas such as spandrel and column areas, the required functions of the completed wall include maintaining aesthetic performance in the exterior environment, providing thermal insulation, and providing a finished interior wall. A popular aesthetic design option for the opaque area is a hidden frame wall unit. There are two major types of opaque hidden frame wall units in today's market.

The first type of opaque hidden frame wall unit is a plate system consisting of a flat facing plate such as aluminum plate, ACM (aluminum composite material), stone, or glass and a perimeter frame to support the plate. The facing plate is structurally tied to the perimeter frame by a connecting means such as adhesive tape, structural silicone caulking, or welded studs, etc. for wind load resistance and sealed in between to provide water-tightness performance. In a conventional wall unit of this type, the connecting location is designed for sealing both air and water requiring a perfect seal. Because no seal can be truly perfect, such wall units are prone to water leakage problems.

In an Airloop System (U.S. Pat. No. 5,598,671, which is incorporated by reference), the water leakage problem is solved by creating a perimeter Airloop to isolate the air seal from the water seal. An Airloop System separates the air seal from the water seal, allowing for pressure equalization between the exterior air and the cavities in the perimeter frame. The equalized air pressure prevents water infiltration into the wall unit. However, the pressure equalization process takes a short period of time, and some incidental water infiltration may occur during that time. The infiltrated water will drain out of an Airloop system via air holes in the perimeter frame. In a hidden frame Airloop system, the water seal and the air seal are on the same vertical plane. Because of this, and the incidental water infiltration that may occur during the short time required for pressure equalization, the tolerable degree of seal imperfection in a hidden frame Airloop system is not as good as that for an exposed frame Airloop system (U.S. Pat. No. 7,134,247, which is incorporated by reference). Separation of the water seal and the air seal into different vertical planes in a hidden frame Airloop system, therefore, is desirable to enhance performance during the time required for pressure equalization.

In addition, quality control for the execution of the connecting means is critical to ensure structural safety against the facing plate being blown away by wind. Another structural problem with hidden frame wall units is that the thin facing plate is flexible and intermediate stiffeners are often required, creating a significant cost increase. To complete the wall system, thermal insulation with a vapor barrier is installed behind the exterior wall unit and a separate interior wall is installed to create the interior aesthetic design. Since the interior surface of the facing plate is in the interior air zone, in cold regions, quality control on the installation of the vapor barrier is critical for preventing interior water condensation on the interior surface of the facing plate. Interior water condensation on the opaque wall unit often leads to latent discovery of the serious problems of wet insulation and connection corrosion.

The second type of opaque hidden frame wall unit is a composite panel system consisting of two thin structural skins with structural insulating core sandwiched in between. The most popular product of this system is known as composite foam panel. The advantage of this system is the significant cost reduction due to the following factors: (1) elimination of perimeter frame due to the combination of structural and thermal insulating functions; (2) elimination of the separate interior wall if the interior panel surface is used as the finished wall surface. However, the system is prone to exterior aesthetic problems known as thermal bowing, thermal blistering and thermal rippling. Such systems also are prone to water leakage problems at the interface locations such as window perimeters.

BRIEF SUMMARY OF THE INVENTION

Preferred embodiments of the invention provide an opaque hidden frame wall unit without the need for intermediate stiffeners for resisting wind load. Preferred embodiments also provide an opaque Airloop hidden frame wall unit with the air seal being isolated from the water seal on an offset vertical plane and away from the interior surface of the facing plate. Further, preferred embodiments provide an opaque Airloop hidden frame wall unit without exterior aesthetic problems and without a separate interior wall. Finally, preferred embodiments of the invention provide an opaque Airloop hidden frame wall unit without interior water condensation problems.

BRIEF DESCRIPTION OF THE DRAWINGS

FIG. 2A shows one embodiment of the fragmental head and sill details of the cross-section taken along Line 2-2 of FIG. 1.

FIG. 2B shows an alternate embodiment of the fragmental head and sill details of the cross-section taken along Line 2-2 of FIG. 1.

DETAILED DESCRIPTION OF THE INVENTION

Figure 1:
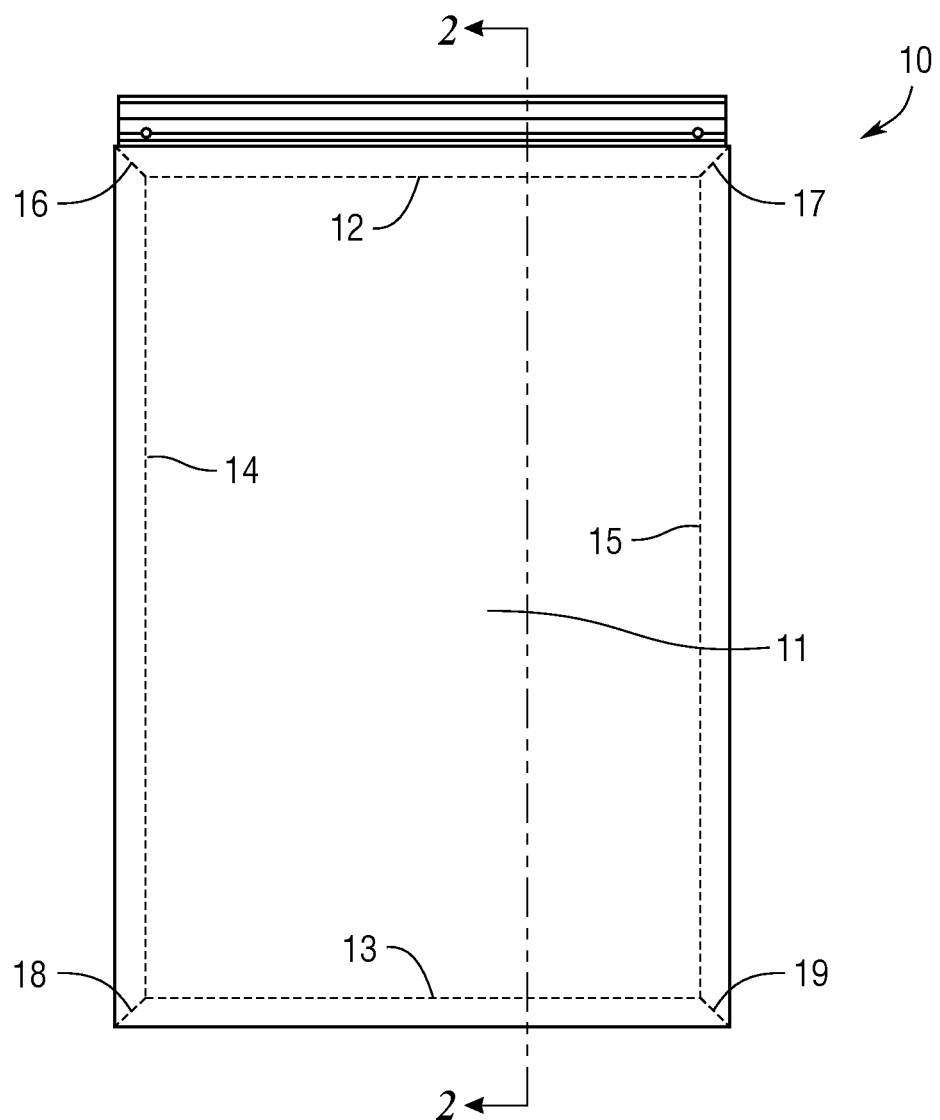
FIG. 1 shows the front view of a typical exterior wall unit of the present invention.

FIG. 1 shows the front view of an Airloop wall unit 10 of an embodiment having a facing plate 11 and four perimeter frame members 12, 13, 14, and 15 hidden behind the facing plate 11. The four members 12, 13, 14, and 15 have compatible cavity profiles such that an inner Airloop is formed when the frames are miter-match connected at the four corners 16, 17, 18, and 19. Member 12 is the head member which is situated at the erected top position of unit 10. Member 13 is the sill member which is situated at the erected bottom position of unit 10. Members 14 and 15 are the jamb members which are situated at the erected sides of unit 10. As shown for illustration purposes, the unit 10 shown in the embodiment of FIG. 1 is a rectangular unit with four perimeter frame members. In other embodiments, the wall unit may be formed into other shapes with at least one perimeter member. For example, a single perimeter member can be formed into a rounded shape, or multiple straight or curved perimeter members miter-matched at all intersection points can be formed into any other shape. The Airloop wall unit 10 embodiment shown in FIG. 1 may be shop assembled in the following sequential steps: (1) provide structural connecting means at each miter-matched corner to form an empty frame consisting of the four members 12, 13, 14, and 15; (2) glaze in the facing plate 11 and a back-up composite insulated panel (shown on FIG. 2A or 2B).

FIG. 2A shows the fragmental head details 20 and the fragmental sill details 30 on the cross-section taken along Line 2-2 of FIG. 1 for a preferred Airloop hidden frame plate system. The glazing process involves the following sequential steps: (1) install the air seal 22 around the frame; (2) secure the composite insulated panel 21 into position on at least one of the frame members using a glazing bead 52 and spaced apart segments of a glazing material 23 to create at least one air gap between two segments of the glazing material 23; (3) secure the facing plate 11 to each of the frame members using an adhesive tape 24. In other embodiments, any other structural panel capable of resisting wind load may be used in place of the preferred composite insulated panel 21. In the preferred embodiment shown in FIG. 2A, the glazing material for securing the panel 21 into position is a wedge gasket 23. Alternative glazing materials, such as caulking or plastic shims, may also be used. Further, alternative structural agents apparent to those of skill in the art, such as structural silicone caulking, welded studs, or anchor bolts, may be used to secure the facing plate to the frame members.

When the composite insulated panel 21 is glazed into position, the inner Airloop 27 is formed. The most commonly used material for the frame members is aluminum extrusion. Popular facing plate 11 materials include aluminum plate, ACM (aluminum composite material), single pane spandrel glass, and finished natural stone. Shown as a preferred system for cold climate regions, a thermal break material 25 is used on all frame members. At least one air hole is drilled through sill member 13 to connect the inner Airloop 27 to the air space below sill member 13. In the preferred embodiment shown in FIG. 2A, the at least one air hole 26 is drilled through the thermal break material to connect the inner Airloop 27 to the air space below the sill member 13.

The erection procedures include the following steps: (1) secure the Airloop unit to the supporting mullions (not shown); (2) install the rain screen member 28 and the water seal member 29; (3) start erecting the unit above by causing the sill member 13 of the unit above to be interlocked with the head member 12, forming the outer Airloop with the inter-connected joint cavities. In this arrangement, the space 31 between the facing plate 11 and the composite insulated panel 21 is pressure-equalized due to the fact that the air gaps between two adjacent segments of the gasket 23 are used to connect the space 31 to the inner Airloop. Therefore, the adhesive tape 24 is acting as a structural agent connecting the facing plate 11 to the frame members and also acting as a water seal since the space 31 is pressure-equalized. Since the space 31 behind the facing plate is pressure-equalized to the exterior air, the wind load on the facing plate 11 is greatly minimized. The facing plate 11 will experience greater wind load during the pressure-equalization process, which lasts for only a short period of time; therefore, the need for intermediate plate stiffeners is eliminated.

As shown, the air seal 22 is far away from the adhesive tape 24 acting as the water seal and also far away from the interior surface of the facing plate 11, enhancing watertightness performance during the time needed for the pressure equalization process.

The gasket segments 23 serve as a glazing material to secure the panel 21 for resisting wind load. The panel 21 is used for resisting the wind load and providing thermal insulation. The smooth interior skin of panel 21 may be used as the finished interior wall surface, while the exterior skin of panel 21 is hidden by the facing plate 11. The interior skin of panel 21 is exposed to the interior air and is isolated from the exterior cold skin by the insulating panel core 32, preventing the temperature of the interior skin of panel 21 from reaching the dew point and consequently preventing interior water condensation.

FIG. 2B shows another preferred embodiment for the fragmental head 40 details and the fragmental sill 50 details on the cross-section taken along Line 2-2 of FIG. 1 for an Airloop hidden frame plate system. The glazing process for this embodiment may involve the following sequential steps: (1) secure the composite insulated panel 21 into position using a glazing bead 52a and continuous glazing material 23a on all frame members; (2) secure the facing plate 11 to each of the frame members using an adhesive tape 24. When the composite insulated panel 21 is glazed into position, the inner Airloop 27 is formed. Shown as a preferred system for cold climate regions, a thermal-break material 25 is used on all frame members. As shown, air holes 26 are drilled through the thermal break material connecting the inner Airloop 27 to the air space below the sill member 13a. In the preferred embodiment shown in FIG. 2B, the continuous gasket 23a is used as the glazing material for securing panel 21 in position and also as the air seal. An additional air seal 41 is required between the glazing bead 52a and the frame member 12a or 13a. The contacting surface 42 between the exterior skin of panel 21 and the frame member 12a or 13a is unsealed to allow pressure equalization air to come from the inner Airloop 27 into the space 31. To reduce the time lag for pressure equalization of space 31, a profile with valleys may be rolled into the exterior skin of panel 21 such that air flow can freely go through the cavities created by the valleys. Other texture variations applied to the exterior skin of panel 21 may also be utilized to increase airflow between the exterior skin of panel 21 and the frame member 12a or 13a. The erection procedures and the functional explanations are the same as explained for the embodiment shown in FIG. 2A.

Even though a typical Airloop hidden frame wall unit is used in illustrating the present invention, some of the design features can be used in other conventional systems to improve their functional performances.

Nothing in the above description is meant to limit the present invention to any specific materials, geometry, or orientation of elements. Many modifications are contemplated within the scope of the present invention and will be apparent to those skilled in the art. The embodiments described herein were presented by way of example only and should not be used to limit the scope of the invention.

The invention claimed is:
1. A wall unit, comprising
an exterior facing plate, a frame member, a structural agent securing said exterior facing plate to the exterior of said frame member, a structural panel secured to said frame member by a glazing bead and a glazing material, wherein said exterior facing plate conceals said structural panel from view on an exterior side of said wall unit, an air seal sealing air on an interior side of said wall unit from air in an air space between said frame member and said structural panel, wherein said air space between said frame member and said structural panel is connected with an air space between said structural panel and said facing plate, and wherein said air space between said frame member and said structural panel is connected and pressure equalized with air on the exterior side of said wall unit.

2. The wall unit of claim 1, wherein said air seal is disposed in a different vertical plane than said structural agent securing said exterior facing plate.

3. The wall unit of claim 1, wherein said structural agent is an adhesive tape.

4. The wall unit of claim 1, wherein said structural panel is a composite insulated panel.

5. The wall unit of claim 4, wherein one side of said composite insulated panel is exposed to a building interior.

6. The wall unit of claim 1, wherein said glazing material is a wedge gasket.

7. The wall unit of claim 6, wherein said glazing bead and said wedge gasket are on an exterior side of said structural panel.

8. The wall unit of claim 6, wherein said glazing bead and said wedge gasket are on an interior side of said structural panel, wherein an exterior side of said structural panel contacts said frame member, and wherein an air-tight seal is not created between said exterior side of said structural panel and said frame member.

9. An exterior wall system comprising a plurality of the wall units of claim 1.

* * * * *